(12) United States Patent
Soriaga et al.

(10) Patent No.: US 11,265,744 B2
(45) Date of Patent: Mar. 1, 2022

(54) PHYSICAL LAYER NON-LINE-OF-SIGHT PATH DISCRIMINATION BASED ON POLARIZATION

(71) Applicant: QUALCOMM Incorporated, San Diego, CA (US)

(72) Inventors: Joseph Binamira Soriaga, San Diego, CA (US); Alexandros Manolakos, San Diego, CA (US); Sony Akkarakaran, Poway, CA (US); Naga Bhushan, San Diego, CA (US); Allen Minh-Triet Tran, Rancho Santa Fe, CA (US); Charles Edward Wheatley, Del Mar, CA (US); Tao Luo, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 16/740,246

(22) Filed: Jan. 10, 2020

(65) Prior Publication Data

US 2020/0229010 A1 Jul. 16, 2020

(30) Foreign Application Priority Data

Jan. 16, 2019 (GR) .............................. 20190100031

(51) Int. Cl.
*H04W 24/08* (2009.01)
*H04L 5/00* (2006.01)
*H04B 17/318* (2015.01)

(52) U.S. Cl.
CPC .......... *H04W 24/08* (2013.01); *H04B 17/318* (2015.01); *H04L 5/0048* (2013.01)

(58) Field of Classification Search
CPC ..... H04W 24/08; H04B 17/318; H04L 5/0048
See application file for complete search history.

(56) References Cited

U.S. PATENT DOCUMENTS

2014/0301495 A1\* 10/2014 Sohn ................. H01Q 1/246
375/267
2015/0382318 A1\* 12/2015 Kim ................... G01S 5/0054
455/456.5
(Continued)

FOREIGN PATENT DOCUMENTS

WO 2010122370 A1 10/2010

OTHER PUBLICATIONS

International Search Report and Written Opinion—PCT/US2020/013412—ISA/EPO—dated Mar. 27, 2020.
(Continued)

*Primary Examiner* — Duc C Ho
(74) *Attorney, Agent, or Firm* — Thien T. Nguyen

(57) ABSTRACT

Disclosed are techniques for determining a line-of-sight (LOS) path between a transmitter and a wireless device in a wireless communications network. In an aspect, a wireless device receives, from the transmitter, a first reference signal transmitted on a first antenna port and a second reference signal transmitted on a second antenna port, the first reference signal having a first polarization and the second reference signal having a second polarization with known difference (e.g., perpendicular) to the first polarization, compares multi-path channels estimated from reception of the first reference signal and the second reference signal to multi-path channels expected from the first reference signal and the second reference signal when transmitted along the LOS path between the transmitter and the wireless device, and determines which path (if any) of the multi-path channels corresponds to the LOS path between the transmitter and the wireless device.

36 Claims, 13 Drawing Sheets

(56) References Cited

U.S. PATENT DOCUMENTS

2016/0149302 A1    5/2016    Sanderovich et al.
2017/0257155 A1*   9/2017    Liang .................. H04L 25/0202
2020/0045608 A1*   2/2020    Calcev ................ H04W 40/205

OTHER PUBLICATIONS

Jaeckel S., et al., "An Explicit Ground Reflection Model for mm-Wave Channels", 2017 IEEE Wireless Communications and Networking Conference Workshops (WCNCW), IEEE, Mar. 19, 2017 (Mar. 19, 2017), 5 Pages, XP033093210, DOI: 10.1109/WCNCW.2017.7919093, [retrieved on May 3, 2017], Section II.A and II.C.

* cited by examiner

PHYSICAL LAYER NON-LINE-OF-SIGHT PATH DISCRIMINATION BASED ON POLARIZATION

CROSS-REFERENCE TO RELATED APPLICATIONS

The present Application for Patent claims priority under 35 U.S.C. § 119 to Greek Patent Application No. 20190100031, entitled "PHYSICAL LAYER NON-LINE-OF-SIGHT PATH DISCRIMINATION BASED ON POLARIZATION," filed Jan. 16, 2019, assigned to the assignee hereof, and expressly incorporated herein by reference in its entirety.

BACKGROUND OF THE DISCLOSURE

1. Field of the Disclosure

Aspects of the disclosure relate generally to telecommunications, and more particularly to physical layer non-line-of-sight (NLOS) path discrimination based on polarization.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service and a fourth-generation (4G) service (e.g., Long-Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large wireless sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method at a wireless device of determining a line-of-sight (LOS) path between a transmitter and the wireless device includes receiving, from the transmitter, a first reference signal transmitted on a first antenna port and a second reference signal transmitted on a second antenna port, the first reference signal having a first polarization and the second reference signal having a second polarization with known difference to the first polarization, comparing multi-path channels estimated from reception of the first reference signal and the second reference signal to multi-path channels expected from the first reference signal and the second reference signal when transmitted along the LOS path between the transmitter and the wireless device, and determining which path of the estimated multi-path channels corresponds to the LOS path between the transmitter and the wireless device.

In an aspect, a method at a wireless device includes receiving, from a transmitter, at least a first reference signal and a second reference signal, the first reference signal transmitted on a first antenna port with a first transmitted polarization and the second reference signal transmitted on a second antenna port with a second transmitted polarization, and estimating at least a first received polarization of the first reference signal and a second received polarization of the second reference signal.

In an aspect, a wireless device includes a memory, at least one transceiver, and at least one processor, the at least one processor configured to receive, from a transmitter device via the at least one transceiver, a first reference signal transmitted on a first antenna port and a second reference signal transmitted on a second antenna port, the first reference signal having a first polarization and the second reference signal having a second polarization with known difference to the first polarization, compare multi-path channels estimated from reception of the first reference signal and the second reference signal to multi-path channels expected from the first reference signal and the second reference signal when transmitted along an LOS path between the transmitter and the wireless device, and determine which path of the estimated multi-path channels corresponds to the LOS path between the transmitter and the wireless device.

In an aspect, a wireless device includes a memory, at least one transceiver, and at least one processor, the at least one processor configured to receive, from a transmitter device via the at least one transceiver, at least a first reference signal and a second reference signal, the first reference signal transmitted on a first antenna port with a first transmitted polarization and the second reference signal transmitted on a second antenna port with a second transmitted polarization, and estimate at least a first received polarization of the first reference signal and a second received polarization of the second reference signal.

In an aspect, a wireless device includes means for receiving, from the transmitter, a first reference signal transmitted on a first antenna port and a second reference signal transmitted on a second antenna port, the first reference signal having a first polarization and the second reference signal having a second polarization with known difference to the first polarization, means for comparing multi-path channels estimated from reception of the first reference signal and the second reference signal to multi-path channels expected from the first reference signal and the second reference signal when transmitted along the LOS path between the transmitter and the wireless device, and means for determining which path of the estimated multi-path channels corresponds to the LOS path between the transmitter and the wireless device.

In an aspect, a wireless device includes means for receiving, from a transmitter, at least a first reference signal and a second reference signal, the first reference signal transmitted on a first antenna port with a first transmitted polarization and the second reference signal transmitted on a second antenna port with a second transmitted polarization, and means for estimating at least a first received polarization of the first reference signal and a second received polarization of the second reference signal.

In an aspect, a non-transitory computer-readable medium storing computer-executable instructions includes computer-executable instructions comprising at least one instruction instructing a wireless device to receive, from the transmitter, a first reference signal transmitted on a first antenna port and a second reference signal transmitted on a second antenna port, the first reference signal having a first polarization and the second reference signal having a second polarization with known difference to the first polarization, at least one instruction instructing the wireless device to compare multi-path channels estimated from reception of the first reference signal and the second reference signal to multi-path channels expected from the first reference signal and the second reference signal when transmitted along the LOS path between the transmitter and the wireless device, and at least one instruction instructing the wireless device to determine which path of the estimated multi-path channels corresponds to the LOS path between the transmitter and the wireless device.

In an aspect, a non-transitory computer-readable medium storing computer-executable instructions includes computer-executable instructions comprising at least one instruction instructing a wireless device to receive, from a transmitter, at least a first reference signal and a second reference signal, the first reference signal transmitted on a first antenna port with a first transmitted polarization and the second reference signal transmitted on a second antenna port with a second transmitted polarization, and at least one instruction instructing the wireless device to estimate at least a first received polarization of the first reference signal and a second received polarization of the second reference signal.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 5A illustrates various properties of reference radio frequency (RF) signals transmitted through a medium, while

Figure 1:
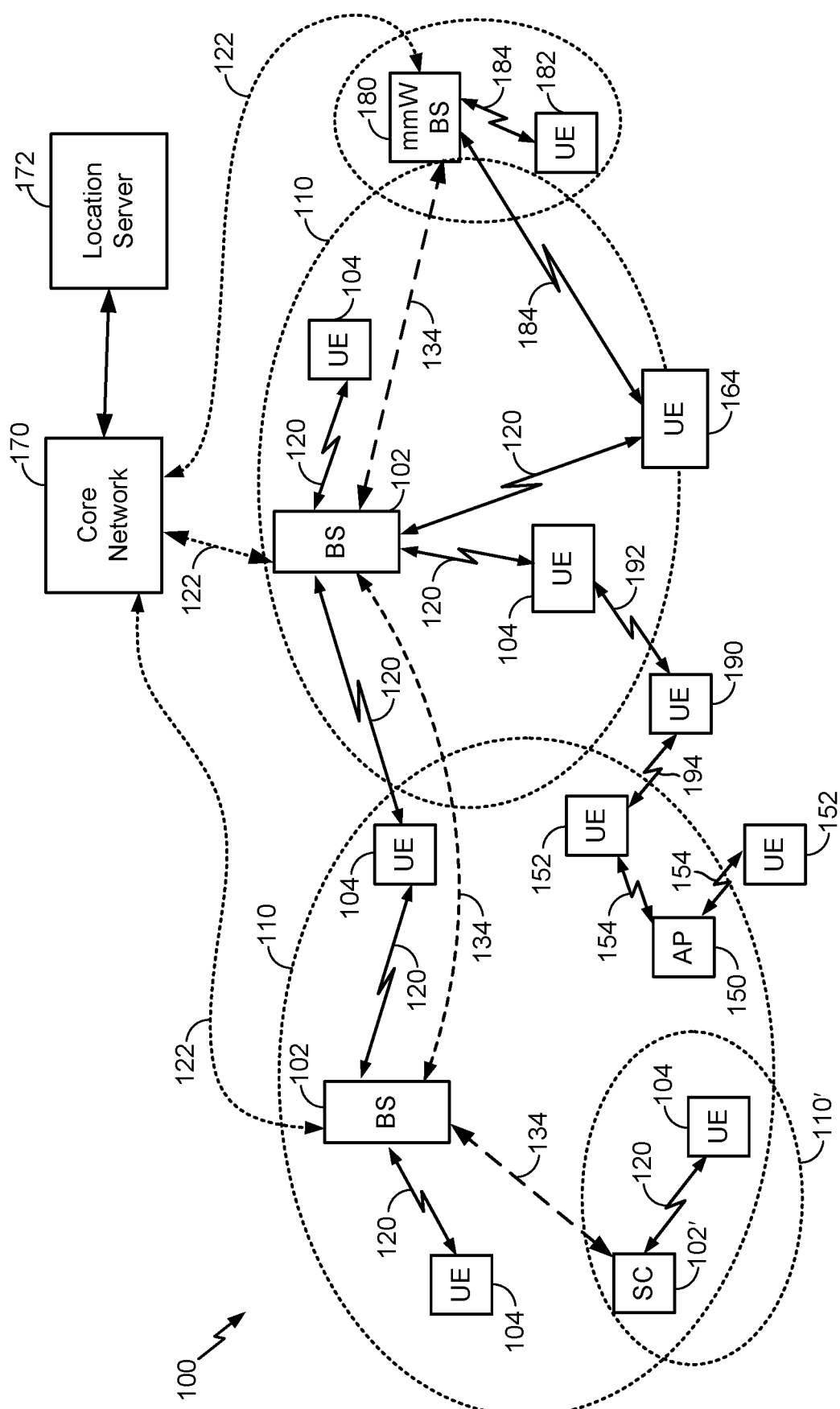
FIG. 1 illustrates an exemplary wireless communications system, according to various aspects.

Elements, stages, steps, and/or actions with the same reference label in different drawings may correspond to one another (e.g., may be similar or identical to one another). Further, some elements in the various drawings may be labelled using a numeric prefix followed by an alphabetic or numeric suffix. Elements with the same numeric prefix but different suffixes may be different instances of the same type of element. The numeric prefix without any suffix is used herein to reference any element with this numeric prefix.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
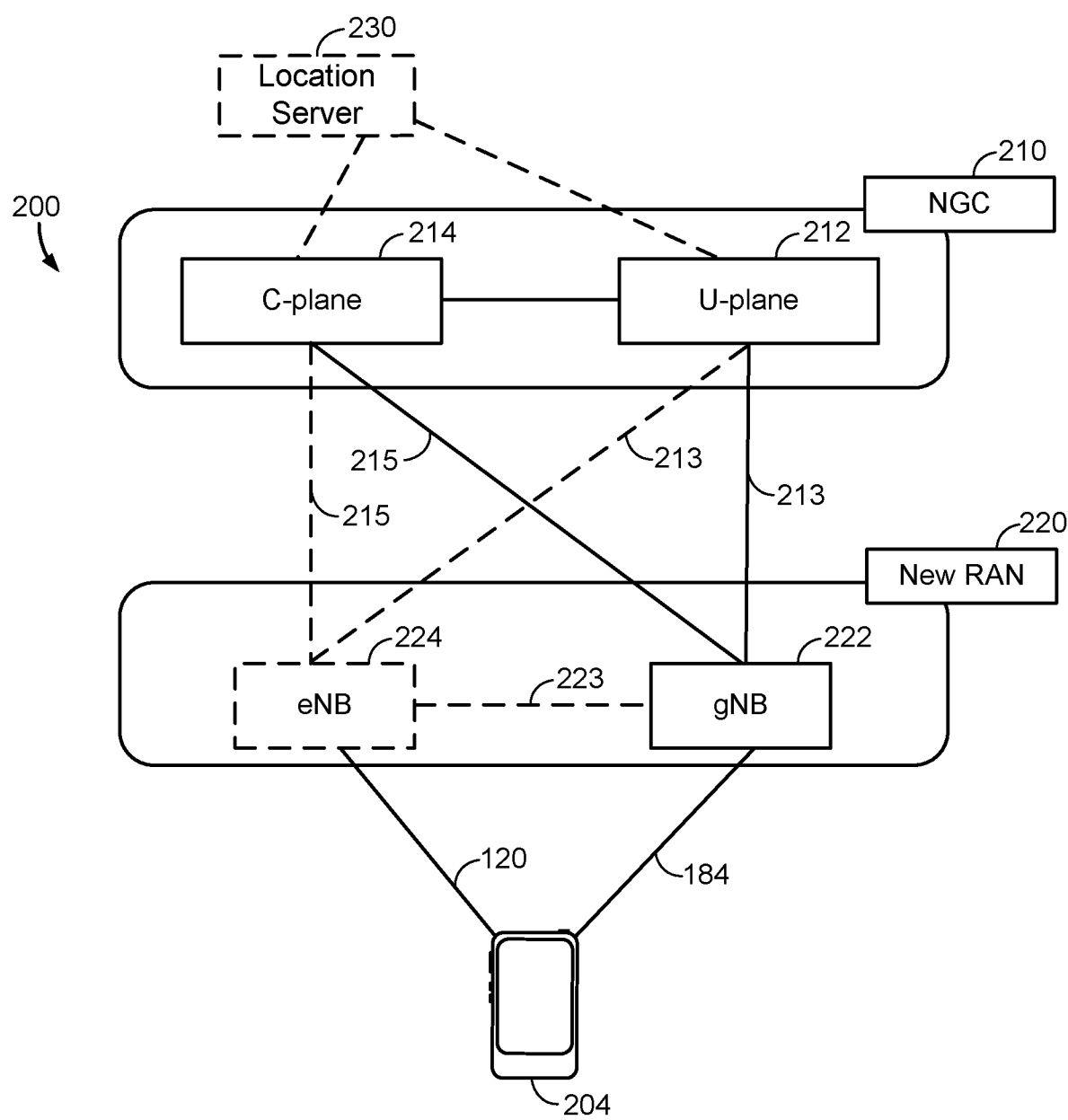
FIGS. 2A and 2B illustrate example wireless network structures, according to various aspects.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
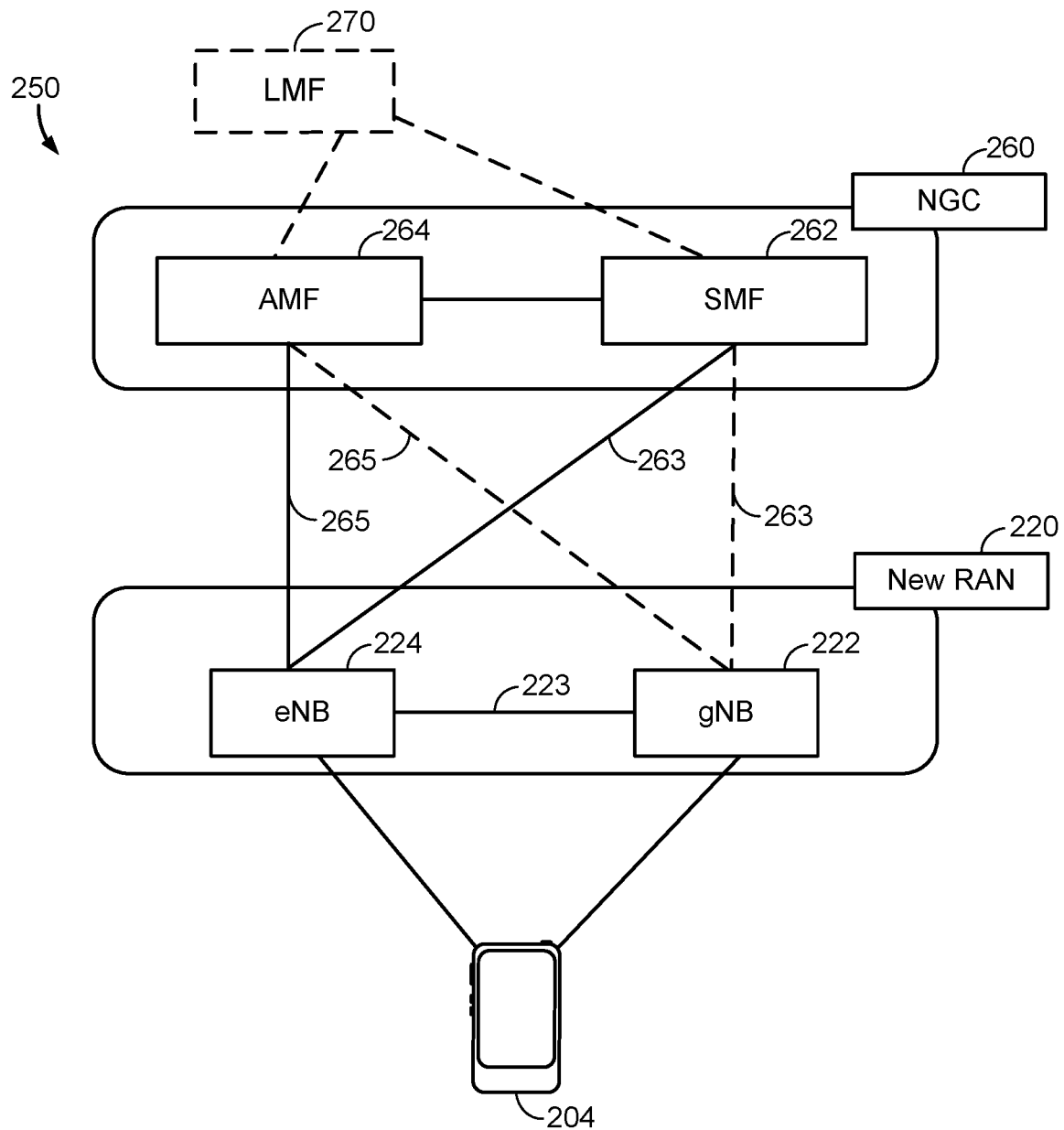

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 263 and control plane interface 265 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
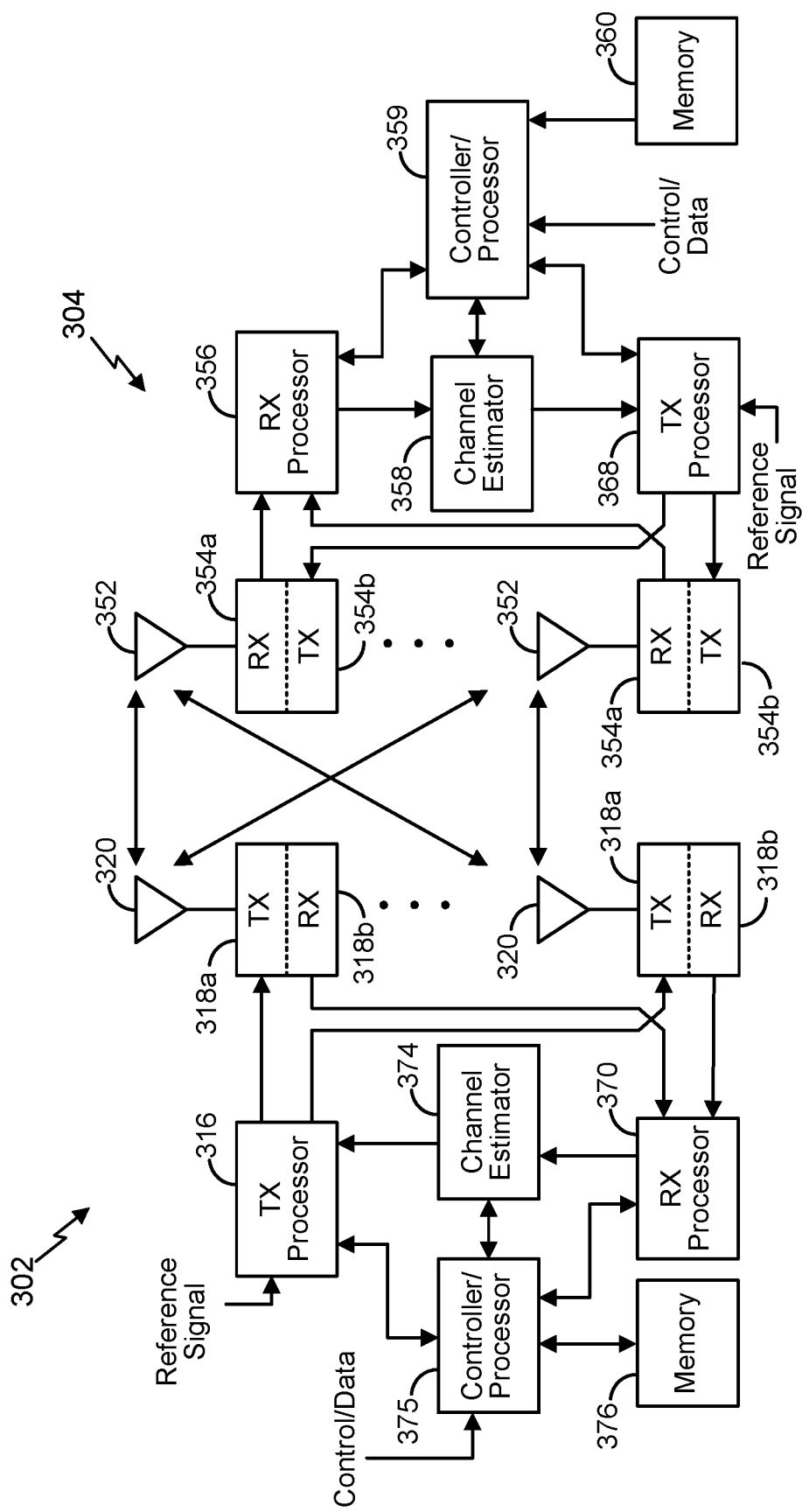
FIG. 3 illustrates an exemplary base station in communication with an exemplary UE in a wireless network, according to aspects of the disclosure.

FIG. 3 illustrates an exemplary base station 302 (e.g., an eNB, a gNB, a small cell AP, a WLAN AP, etc.) in communication with an exemplary UE 304 in a wireless network, according to aspects of the disclosure. The base station 302 may correspond to any of base stations 102, 150, and 180 in FIG. 1 or gNB 222 or eNB 224 in FIGS. 2A and 2B, and the UE 304 may correspond to any of UEs 104, 152, 182, 190 in FIG. 1 or UE 204 in FIGS. 2A and 2B. In the DL, IP packets from the core network (NGC 210/NGC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 304. Each spatial stream may then be provided to one or more different antennas 320 via a separate transmitter 318*a*. Each transmitter 318*a* may modulate an RF carrier with a respective spatial stream for transmission.

At the UE 304, each receiver 354*a* receives a signal through its respective antenna 352. Each receiver 354*a* recovers information modulated onto an RF carrier and provides the information to the RX processor 356. The TX processor 368 and the RX processor 356 implement Layer-1 functionality associated with various signal processing functions. The RX processor 356 may perform spatial processing on the information to recover any spatial streams destined for the UE 304. If multiple spatial streams are destined for the UE 304, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 302. These soft decisions may be based on channel estimates computed by the channel estimator 358. The soft decisions are then decoded and de-interleaved to recover the data and control signals that were originally transmitted by the base station 302 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 302, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 302 may be used by the TX processor 368 to select the appropriate coding and modulation schemes, and to facilitate spatial processing. The spatial streams generated by the TX processor 368 may be provided to different antenna 352 via separate transmitters 354*b*. Each transmitter 354*b* may modulate an RF carrier with a respective spatial stream for transmission. In an aspect, the transmitters 354*b* and the receivers 354*a* may be one or more transceivers, one or more discrete transmitters, one or more discrete receivers, or any combination thereof.

The UL transmission is processed at the base station 302 in a manner similar to that described in connection with the receiver function at the UE 304. Each receiver 318*b* receives a signal through its respective antenna 320. Each receiver 318*b* recovers information modulated onto an RF carrier and provides the information to a RX processor 370. In an aspect, the transmitters 318*a* and the receivers 318*b* may be one or more transceivers, one or more discrete transmitters, one or more discrete receivers, or any combination thereof.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 304. IP packets from the controller/processor 375 may be provided to the core network. The controller/processor 375 is also responsible for error detection.

Figure 4:
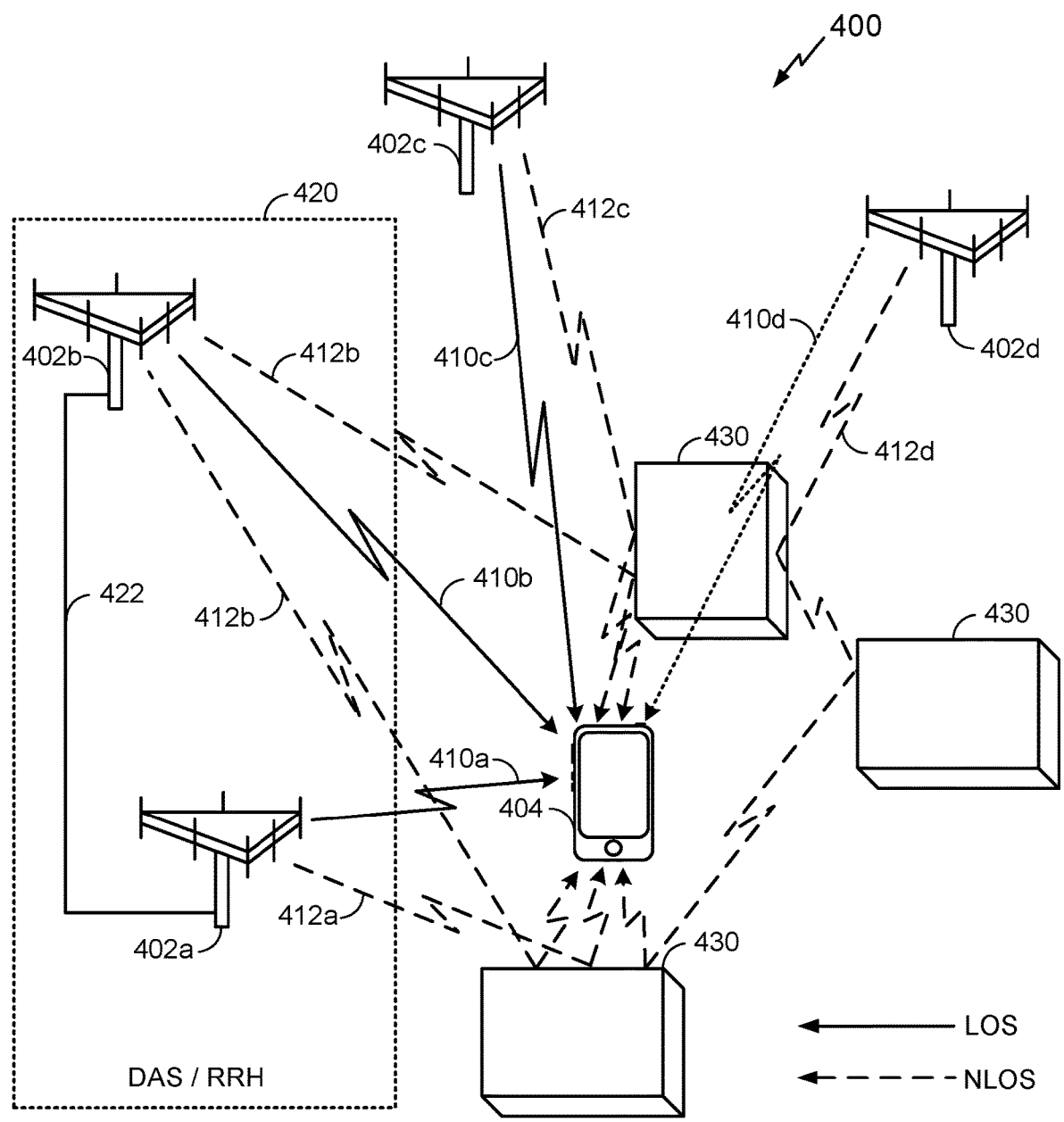
FIG. 4 illustrates an exemplary wireless communications system according to various aspects of the disclosure.

FIG. 4 illustrates an exemplary wireless communications system 400 according to various aspects of the disclosure. In the example of FIG. 4, a UE 404 is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402*a*-*d* (collectively, base stations 402), which may correspond to, for example, any combination of base stations 102 and 180 and/or WLAN AP 150 in FIG. 1, using RF signals and standardized protocols for the modulation of the RF signals and the exchange of information packets. Note that while FIG. 4 illustrates one UE 404 and four base stations 402, as will be appreciated, there may be more UEs 404 and more or fewer base stations 402.

FIG. 4 further illustrates an aspect in which base stations 402*a* and 402*b* form a DAS/RRH 420. For example, the base station 402*a* may be the serving base station of the UE 404 and the base station 402*b* may be a neighbor base station of the UE 404. As such, the base station 402*b* may be the RRH of the base station 402*a*. The base stations 402*a* and 402*b* may communicate with each other over a wired or wireless link 422.

To support position estimates, the base stations 402 may be configured to broadcast reference RF signals (e.g., positioning reference signals (PRS), navigation reference signals (NRS), tracking reference signals (TRS), cell-specific reference signals (CRS), channel state information reference signals (CSI-RS), demodulation reference signals (DMRS), synchronization signals, etc.) to UEs 404 in their coverage area to enable a UE 404 to measure reference RF signal timing differences (e.g., observed time difference of arrival (OTDOA) or reference signal time difference (RSTD)) between pairs of network nodes and/or to identify the line of sight (LOS) or shortest radio path between the UE 404 and the transmitting base stations 402. Identifying the LOS/shortest path is of interest not only because that path can subsequently be used for OTDOA measurements between a pair of base stations 402, but also because identifying the shortest path can directly provide some positioning information based on the direction of the path. Moreover, identification of the shortest path can be used for other position estimation methods that require precise ToA estimation, such as round-trip-time (RTT)-based methods.

As noted above, 5G supports operation at very high and even extremely-high frequency (EHF) bands, such as mmW frequency bands. One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz or 5 GHz bands.

Propagation loss is also an issue in MIMO and massive MIMO systems in any band. The term MIMO as used herein generally refers to both MIMO and massive MIMO. MIMO is a method for multiplying the capacity of a radio link by using multiple transmit and receive antennas to exploit multipath propagation. Multipath propagation occurs because RF signals not only travel by the shortest path between the transmitter and receiver, which may be a LOS path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To accurately determine the position of a UE 404 using the RTT procedures described above with reference to FIGS. 5-6B, the UE needs to measure the reference RF signals received over the LOS path (or the shortest NLOS path where an LOS path is not available), between the UE 404 and a network node (e.g., a base station 402, an antenna or antenna array of a base station 402). However, as discussed above, RF signals travel not only by the LOS/shortest path between the transmitter and receiver, but also over a number of other paths (multipaths) as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 704.

Specifically, FIG. 4 illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over an LOS path 410d and an NLOS path 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" or "shortest path" between a transmitter and receiver refers to the straight line path from the transmitter to the receiver. However, such a path may not be an actual LOS path (due to blockages). In that case, the next available path is an NLOS path, which reflects off of some surface(s) when travelling from the transmitter to the receiver.

Electromagnetic waves (RF signals) are transverse waves, meaning that an electromagnetic wave oscillates perpendicular to the direction in which it is travelling. The polarization of an electromagnetic wave specifies the geometrical orientation of the oscillations. For example, an electromagnetic wave may oscillate side to side, up and down, or any direction around the path of travel. Note that an electromagnetic wave consists of an oscillating electric field and magnetic field that are always perpendicular to each other. By convention, the "polarization" of an electromagnetic wave refers to the direction of the electric field.

A major bottleneck is determining the ToA measurement for the LOS path is separating the measurement of the LOS path from measurements of NLOS paths. The present disclosure provides techniques for using the polarization of a received reference RF signal to determine whether it followed an LOS path or an NLOS path from the transmitter (e.g., a base station) to the receiver (e.g., a UE). More specifically, the present disclosure provides techniques to enable a receiver (e.g., a UE or base station) to determine from a multipath channel estimation which paths correspond to the LOS path (if they can be measured), so that the resulting positioning estimate can be more accurate. For example, if the polarization with which a reference RF signal is transmitted is known, the receiver can compare the polarization of the RF signal when it is received to the expected polarization, and if it is sufficiently different, the receiver can determine that the reference RF signal did not follow an LOS path. However, if the polarization of the RF signal when it is received is the same as the expected polarization, the receiver can determine that the reference RF signal did follow an LOS path. Reference RF signals that did not follow an LOS path can be discarded, while reference RF signals that did follow an LOS path can be used for positioning or other purposes.

Figure 5A:
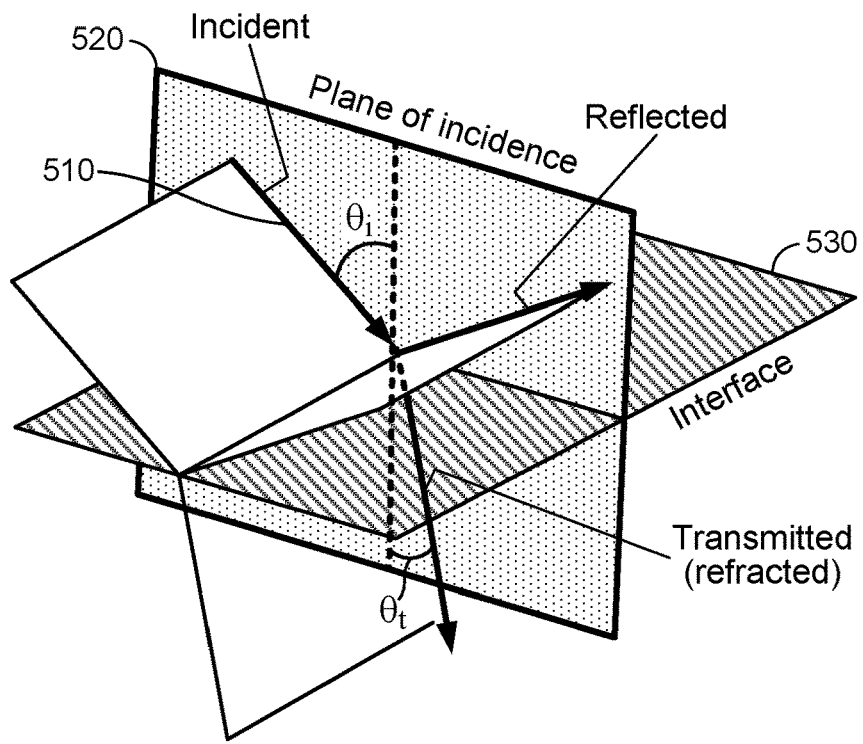

FIG. 5A illustrates various properties of a reference RF signal transmitted through a medium, according to aspects of the disclosure. As shown in FIG. 5A, a reference RF signal is traveling along an incident path 510 in a plane of incidence 520 and impacts an interface 530 (e.g., an obstruction, such as glass, concrete, the ground, etc.). A portion of the reference RF signal is reflected off of the interface 530, and a portion is transmitted (refracted) through the interface 530. The angle at which the incident path 510 meets the interface 530 is referred to as the angle of incidence ($\theta_i$), and the angle at which the reference RF signal passes through the interface 530 is referred to as the angle of refraction ($\theta_t$). The angle of reflection is equal to the angle of incidence.

Figure 5B:
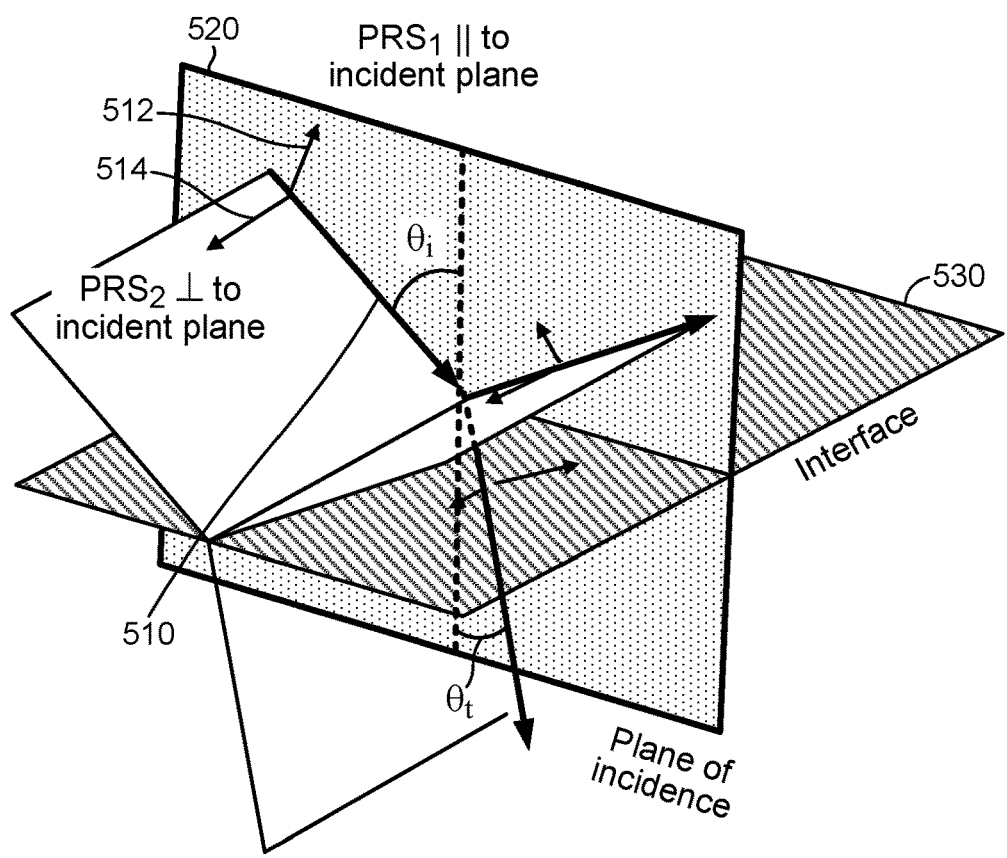
FIG. 5B illustrates how the polarization for different reference RF signals would be affected, according to aspects of the disclosure.

FIG. 5B illustrates how the polarizations for different reference RF signals would be affected by transmission through a medium, according to aspects of the disclosure. In the example of FIG. 5B, a transmitter (e.g., a base station) has transmitted two reference RF signals (referred to as "PRS$_1$" and "PRS$_2$") on two antenna ports along the incident path 510 with perpendicular polarizations, as indicated by reference lines 512 and 514. Specifically, the polarization of the first reference RF signal (PRS$_1$) is parallel to the plane of incidence 520, as indicated by reference line 512, and the polarization of the second reference RF signal (PRS$_2$) is perpendicular to the plane of incidence 520, as indicated by reference line 514. Note that antenna ports do not correspond to physical antennas, but rather, are logical entities distinguished by their reference signal sequences. Thus, multiple antenna port signals can be transmitted on a single transmit antenna, and a single antenna port can be spread across multiple transmit antennas.

After impacting the interface 530, the direction of the polarization of the first reference RF signal (PRS$_1$) and second reference RF signal (PRS$_2$) will have different reflection and transmission coefficients, inducing a change relative to the transmitter. That is, the direction of polarization will have rotated some amount around the incident path 510 upon which the reference RF signals are travelling.

More specifically, if the reflection indexes n$_i$ and n$_r$ are known for the media on the incident and refraction sides, respectively, of the interface 530, the angle of refraction $\theta_r$ for a given angle of incidence $\theta_i$ can be calculated from Snell's Law as:

$$n_i \sin \theta_i = n_r \sin \theta_r$$

For a given angle of incidence $\theta_i$ and angle of refraction $\theta_r$, the reflection coefficient parallel to the plane of incidence 520 (represented as "R$_\parallel$") can be calculated as:

$$R_\parallel = \frac{\tan^2(\theta_i - \theta_r)}{\tan^2(\theta_i + \theta_r)}$$

The reflection coefficient perpendicular to the plane of incidence 520 (represented as "R$_\perp$") can be calculated as:

$$R_\perp = \frac{\sin^2(\theta_i - \theta_r)}{\sin^2(\theta_i + \theta_r)}$$

R$\parallel$ and R$\perp$ measure the receive power of the reference RF signal parallel and perpendicular, respectively, to the plane of incidence 520. Similar calculations can be repeated for the transmission power, that is, the power of the refracted reference RF signal.

Figure 6:
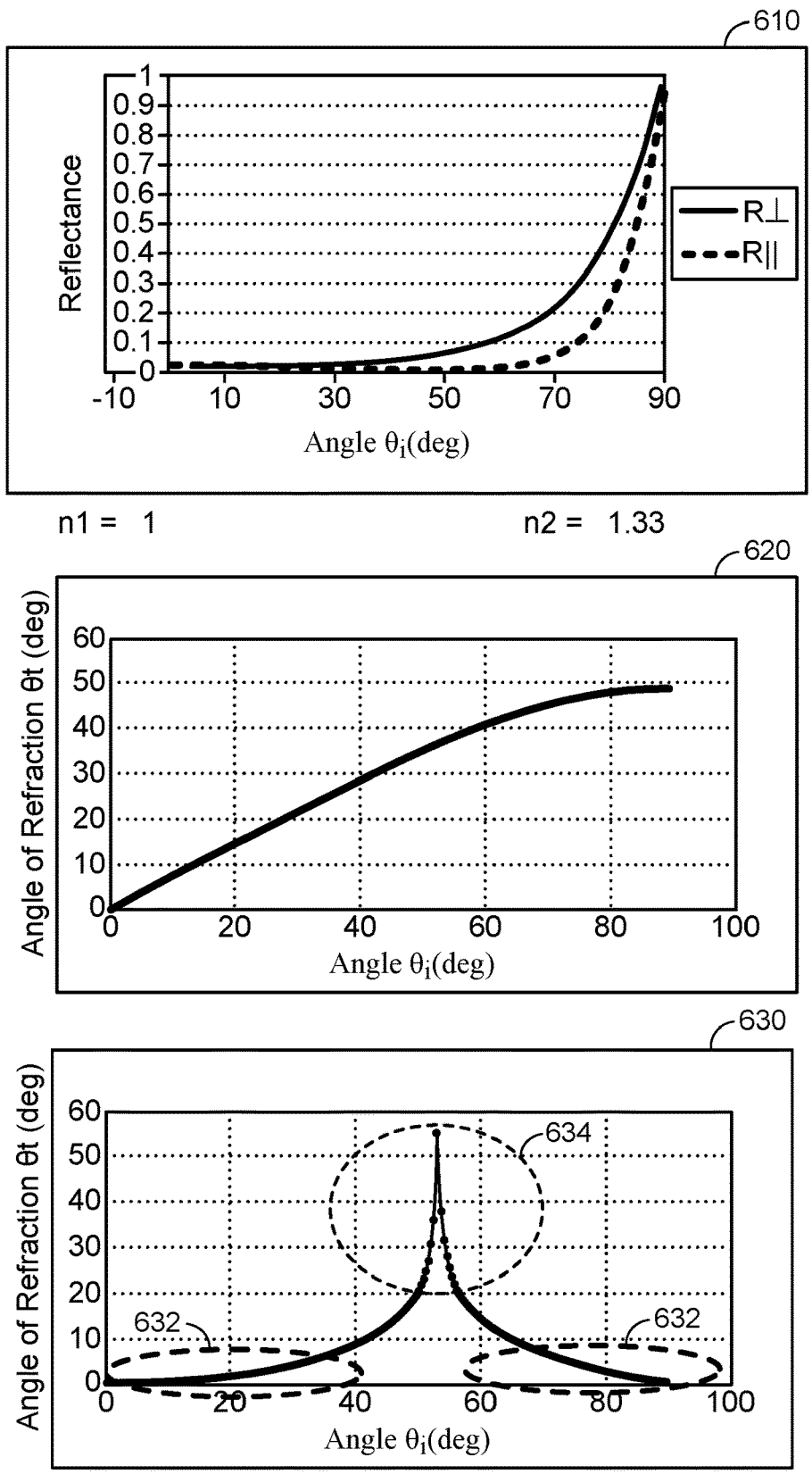
FIG. 6 shows several graphs illustrating various properties of refracted RF signals, according to aspects of the disclosure.

FIG. 6 shows several graphs illustrating various properties of refracted RF signals, according to aspects of the disclosure. A first graph 610 illustrates the relationship between the level of reflectance (between 0 and 1) and the angle of incidence ($\theta_i$) for reflection indexes n1=1 and n2=1.33. A second graph 620 illustrates the relationship between the angle of refraction ($\theta_r$) and the angle of incidence ($\theta_i$). A third graph 630 illustrates the relationship between the parallel and perpendicular power of a reference RF signal based on the angle of incidence ($\theta_i$). Highlighted regions 632 are regions where the change in polarization due to a reflection may not be detectable depending on receiver tolerances/capabilities. Highlighted region 634 is a region where the change in polarization due to a reflection is detectable. Note, however, that there may be a singularity at Brewster's angle where only a single polarization is reflected, and the orthogonal polarization is transmitted.

The foregoing discussion has assumed an ideal orientation of the polarization of a reference RF signal relative to the plane of incidence and the interface. However, if the polarization of the reference RF signal is rotated relative to the reflected surface, then power detection may not be sufficient to determine whether the polarization has changed since the reference RF signal was transmitted by the transmitter. Note that in reality, the relative orientation of the reflected surface and the transmitter may not be controllable.

Figure 7:
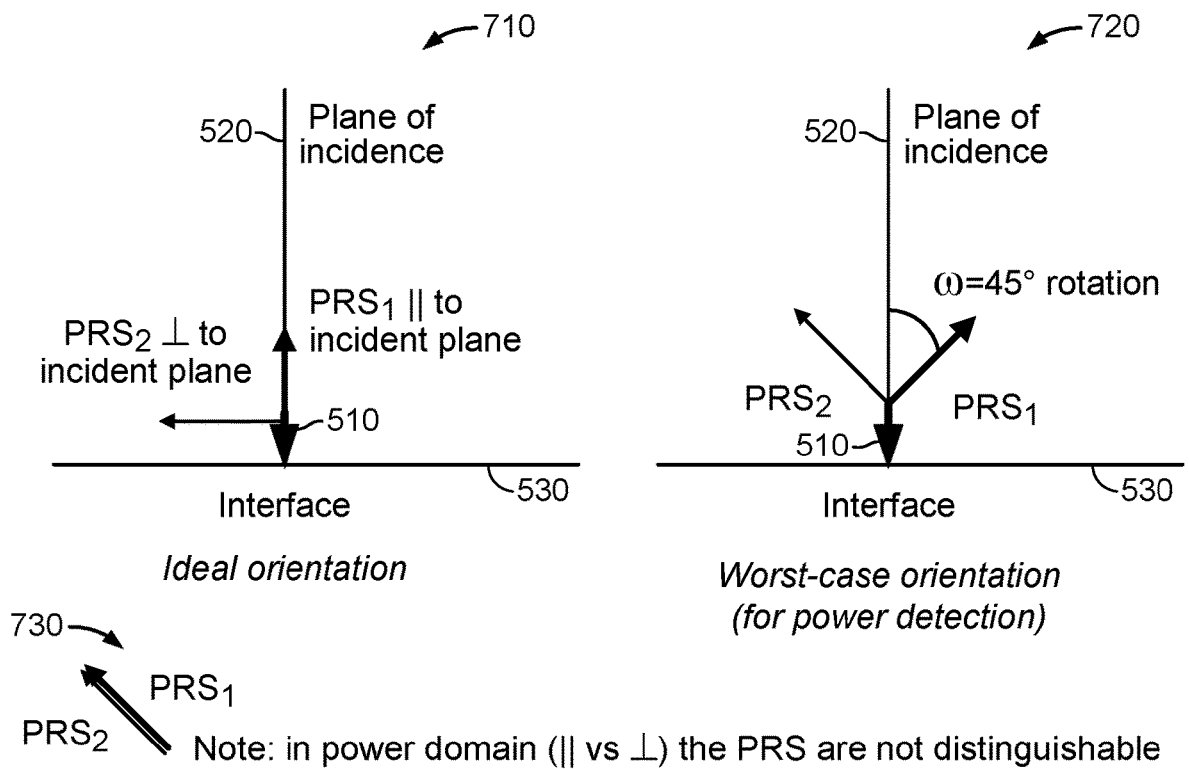
FIG. 7 illustrates a comparison between ideal polarization orientation and worst case polarization orientation, according to aspects of the disclosure.

FIG. 7 illustrates a comparison between ideal polarization orientation and worst case polarization orientation, according to aspects of the disclosure. In FIG. 7, the horizontal axis represents the interface (e.g., interface 530) and the vertical axis represents the plane of incidence (e.g., plane of incidence 520). Additionally, the incident path 510 is coming out of the page. Two reference RF signals (PRS$_1$ and PRS$_2$) are following the incident path 510.

As shown in graph 710, the ideal orientation of the polarization of the reference RF signals is parallel to the plane of incidence 520 (PRS$_1$) and perpendicular to the plane of incidence 530 (PRS$_2$). This orientation is the easiest for the receiver to detect the polarization of the reference RF signals based on the power (R$_\parallel$ and R$\perp$) of the reference RF signals. In contrast, as shown in graph 720, if the polarization of the reference RF signals has rotated 45 degrees from the plane of incidence 520 (note that the polarization of the two reference RF signals is always perpendicular to each other), it is the worst case orientation for power detection. Specifically, in that case, as shown by reference number 730, the two reference RF signals (e.g., PRS$_1$ and PRS$_2$) appear to have the same orientation in the power domain.

Figure 8:
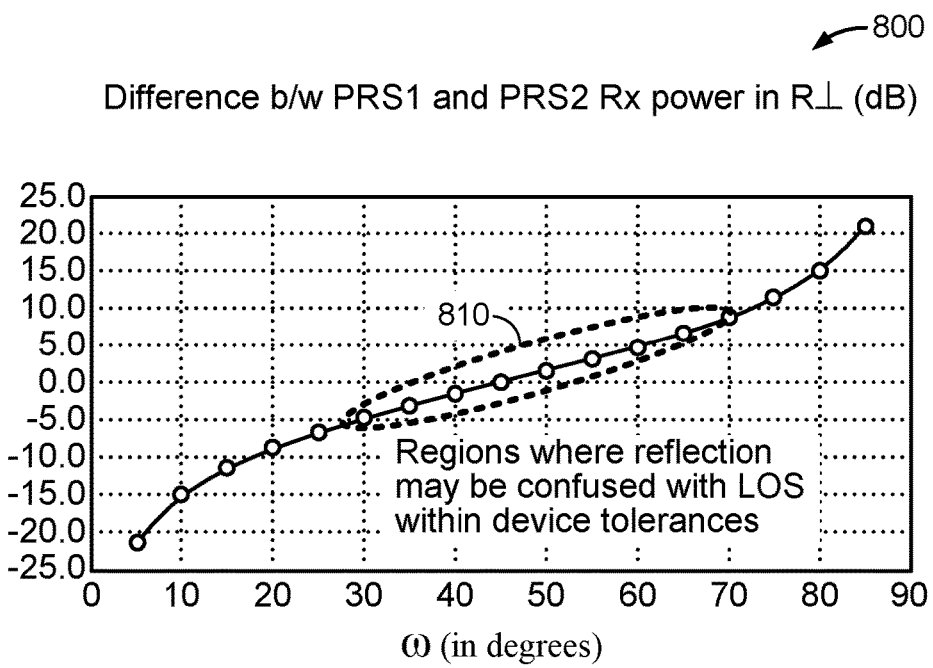
FIG. 8 illustrates how rotating the polarization of a set of reference RF signals affects the receive power of the signals at the receiver, according to aspects of the disclosure.

There are various solutions to the problem of non-ideal polarization orientation. As a first option, if the receiver is using power detection, the transmitter can transmit a first set of reference RF signals (e.g., PRS$_1$ and PRS$_2$) at a first polarization orientation, a second set of reference RF signals at a second polarization orientation, and so on. The rotation between the sets of reference RF signals can be random or uniform. The receiver can report the measurements of the different sets of reference RF signals (for earliest ToA) along the rotation. FIG. 8 illustrates how rotating the polarization of a set of reference RF signals (e.g., PRS$_1$ and PRS$_2$) affects the receive power of the RF signals at the receiver, according to aspects of the disclosure. As shown in graph 800, there are regions 810 in which a reflection of the RF signal may be confused with an LOS path version of the RF signal due to device tolerances/capabilities. Thus, rotation of the polarization of the reference RF signals as they are transmitted ensures that one of the orientations with a larger differential can be observed by the receiver.

Figure 9:
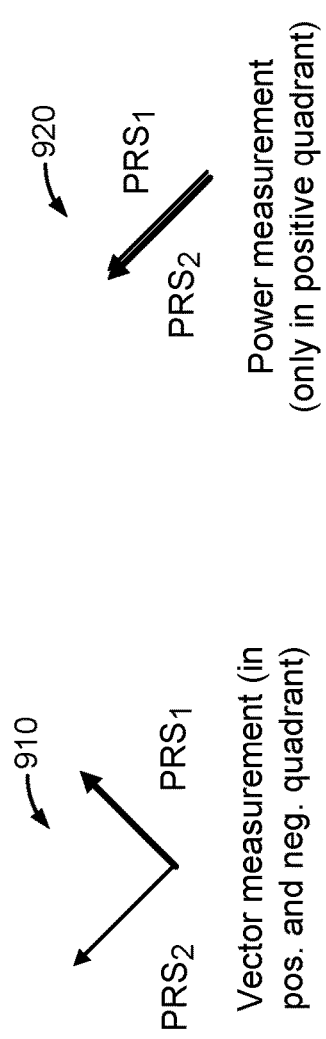
FIG. 9 illustrates a comparison of a vector measurement and a power measurement of a set of reference RF signals, according to aspects of the disclosure.

As a second option, the receiver can use a vector measurement (e.g., amplitude) of the measurements (e.g., earliest ToA) of the set of reference RF signals and report those values. For example, detecting and reporting the amplitude (instead of the receive power) can avoid ambiguities. FIG. 9 illustrates a comparison of a vector measurement 910 and a power measurement 920 of a set of reference RF signals (e.g., PRS$_1$ and PRS$_2$), according to aspects of the disclosure. As shown in FIG. 9, the vector measurement 910 can distinguish the positive and negative quadrant, and thus, the different polarizations of the reference RF signals PRS$_1$ and PRS$_2$ in the worst-case orientation. In contrast, as noted above with reference to FIG. 7, the two reference RF signals PRS$_1$ and PRS$_2$ would appear to have the same orientation in the power domain in the worst-case scenario.

In an aspect, for a receiver (e.g., a UE) to determine the rotation of the polarization of a reference RF signal without reporting measurements to the network (e.g., the serving base station, location server 230, LMF 270), the network would indicate to the receiver how the set of reference RF signals (e.g., PRS$_1$ and PRS$_2$) are oriented at transmission so that the receiver can compare its measurements of the RF signals against the expected measurements for an LOS path. (For an LOS path, the expected measurements would indicate that the RF signals had the same polarization at reception that they did at transmission.) This may be done through RRC configuration, higher layer signaling, Layer 1 signaling, downlink control information (DCI), by specification in the applicable standard, and/or the like. In addition, the rotation may be specified across several RE's in time or frequency, and may further employ code division multiplexing (CDM) for separation at the receiver.

In an aspect, if the receiver is using vector measurements of received reference RF signals, the transmitter can rotate the reference RF signals (e.g., PRS$_1$ and PRS$_2$), randomly or uniformly, and the network can indicates to the receiver how they were rotated. Again, the receiver can compare its measurements of the received RF signals against the expected measurements for an LOS path.

In some case, a reflection may occur very close to the receiver, as in the case of a ground reflection (where the RF signal bounces of the ground before being received by the receiver). In those cases, the difference in the ToA of the reflected RF signal and the RF signal that followed the LOS path may be very small with respect to the pulse shape, such that the LOS path and reflection waveforms constructively/destructively interfere with each other. More specifically, destructive/constructive interference would induce changes to the pulse shape, i.e., convolution of delay profile with ideal pulse.

Figure 10:
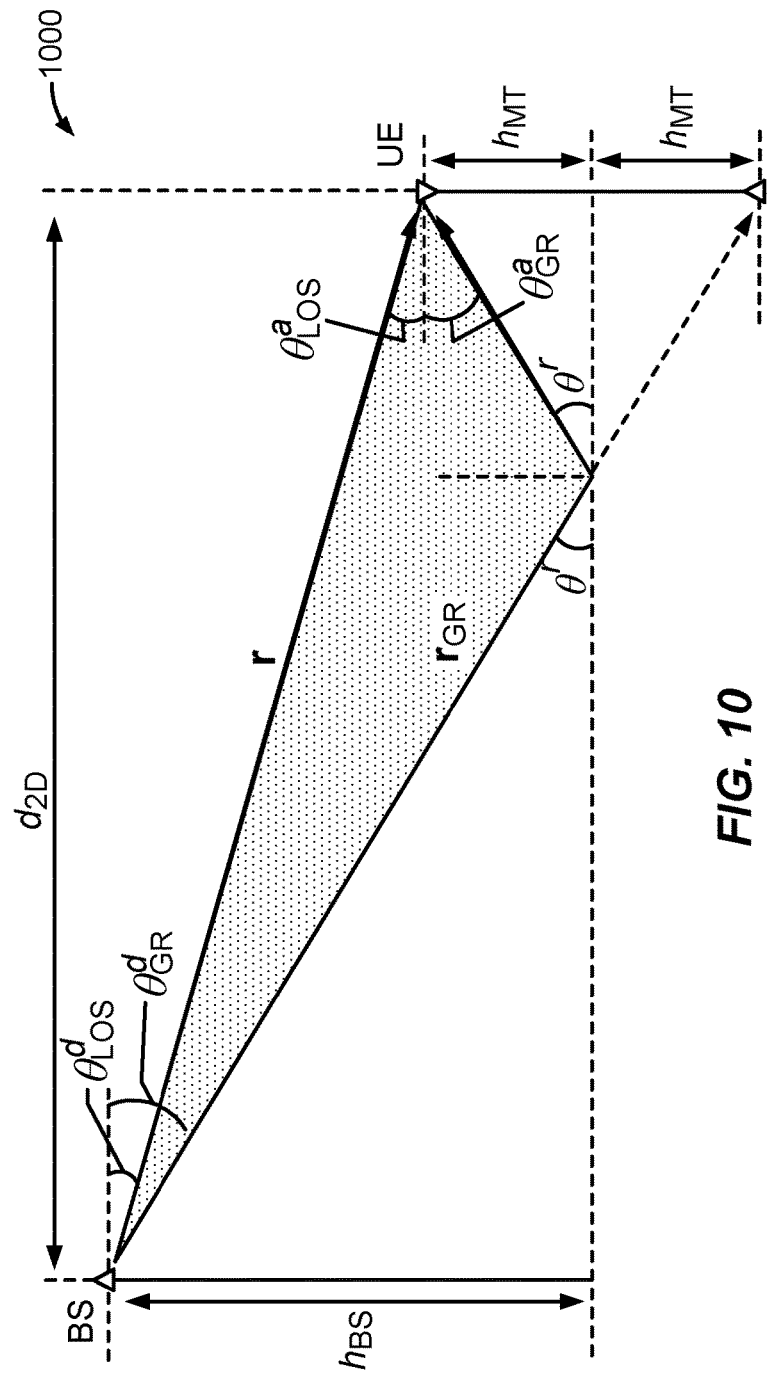
FIG. 10 illustrates angles and vectors associated with the ground reflection model, according to aspects of the disclosure.

FIG. 10 illustrates angles and vectors associated with the ground reflection model, according to aspects of the disclosure. In the example of FIG. 10, a UE is a horizontal distance $d_{2d}$ away from a base station (BS). The base station is a height $h_{BS}$ above the ground, and the UE is a height $h_{MT}$ above the ground. The base station transmits a first RF signal along an LOS path r at an angle of $\theta_{LOS}^d$ below horizontal, and along a ground reflection (GR) path $r_{GR}$ at an angle of $\theta_{GR}^d$ below horizontal. The RF signal traveling along the LOS path r arrives at the UE at an angle of $\theta_{LOS}^a$ above horizontal, and the RF signal traveling along the GR path $r_{GR}$ arrives at the UE at an angle of $\theta_{GR}^a$ below horizontal. The RF signal traveling along the GR path $r_{GR}$ reflects off of the ground at an angle of $\theta^r$ above horizontal. More details of the ground reflection model can be found in the document by Stephan Jaeckel et al. entitled "An Explicit Ground Reflection Model for mm-Wave Channels," which is incorporated by reference herein in its entirety.

To address ground reflection, a receiver (e.g., a UE) may report multiple ToA measurements (e.g., for earliest path, strongest path) to the base station, including separate measurements per polarization. This may allow a determination of the reflection and may improve estimation of the actual propagation delay for the LOS and reflected paths. Alternatively, this may be implemented on the UE side if the network has conveyed the full reference RF signal configuration information to the UE.

There are additional signaling implications. For example, a receiver (e.g., a UE) may need to indicate to the network (e.g., the serving base station, location server 230, LMF 270) its capability to measure polarizations within a calibrated tolerance for NLOS detection. The network may need to indicate that a set of reference RF signals (e.g., PRS$_1$ and PRS$_2$) are quasi-co-located across different polarizations when the receiver takes its measurements of the RF signals. Quasi-co-located RF signals may be beamformed along the same direction, may experience the same level of multipath, etc.

Further, the analysis of polarization described above refers to the reflected signal (or "ground reflection"). Transmission through a medium (e.g., glass, concrete, etc.) has a similar analysis but uses transmission formulas. Transmission through a medium will affect polarization similar to reflection. Direct paths through a medium are good for positioning, but may end up being pruned from the positioning solution because of the polarization change, depending on the implementation. In addition, many paths may be a mix of transmission through a medium followed by a reflection, making this further hard to distinguish. The best case is discrimination between unobstructed free-space and otherwise.

A further aspect disclosed herein provides for split-band measurements of the polarization of reference RF signals. In an aspect, a set of reference RF signals (e.g., PRS$_1$ and PRS$_2$) may be given different polarizations across different segments of bandwidth, with one set of polarizations per segment of bandwidth. A receiver (e.g., a UE) can measure polarizations per band to determine a change in polarization, and then combine segments to improve timing resolution. The network (e.g., a serving base station, location server 230, LMF 270) may signal the relative polarizations of the set of reference RF signals and how they are split across the bandwidth segments, and the receiver can use measurements to deduce whether reflection occurred. Alternatively, the receiver can report ToA information (or received power and signal-to-noise ratio (SNR)) with respect to each bandwidth segment so that the network may deduce where the measurements occurred.

Figure 11:
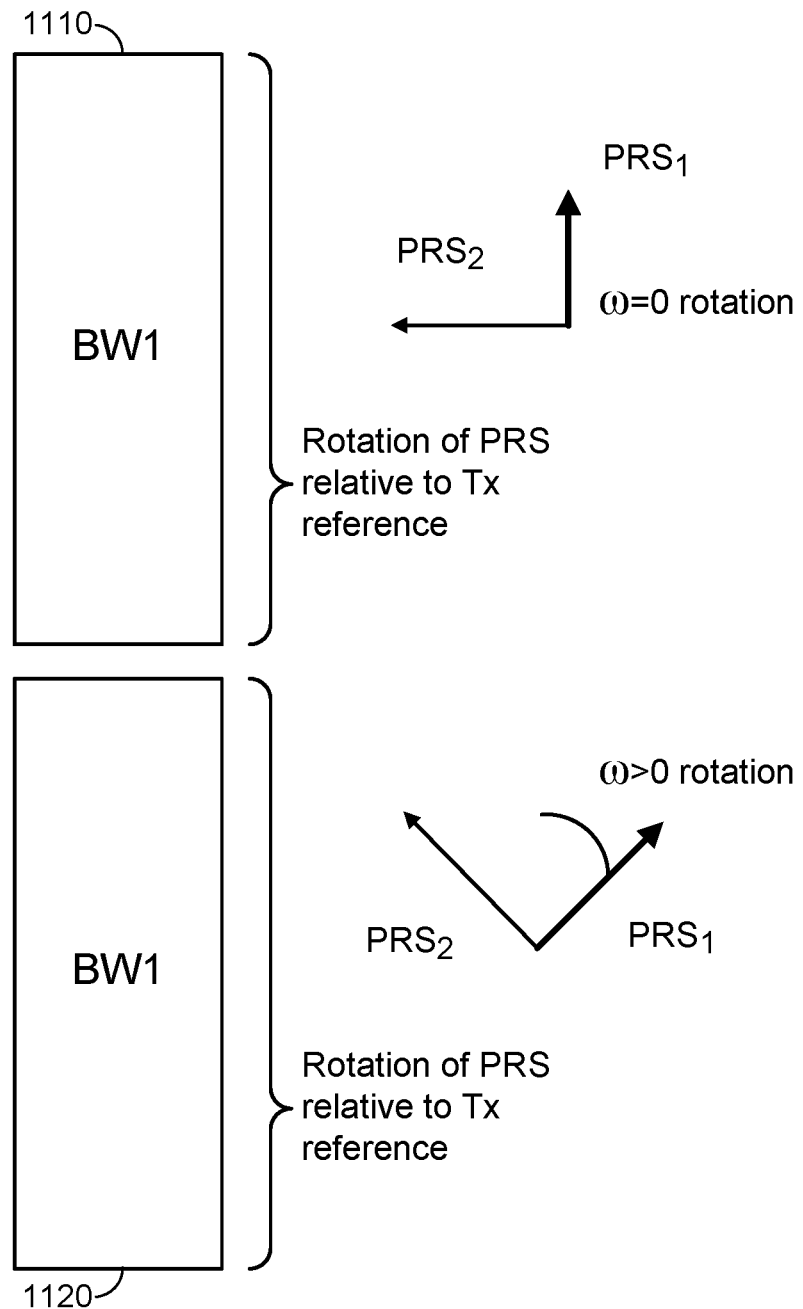
FIG. 11 illustrates an example of split-band polarization, according to aspects of the disclosure.

FIG. 11 illustrates an example of split-band polarization, according to aspects of the disclosure. In the example of FIG. 11, a set of reference RF signals (e.g., PRS$_1$ and PRS$_2$) are transmitted on a first bandwidth segment (BW1) 1110 with 0 angular rotation (ω) relative to the transmitter. On a second bandwidth segment (BW2) 1120, however, a set of reference RF signals (e.g., PRS$_1$ and PRS$_2$) are transmitted with greater than 0 angular rotation (ω) relative to the transmitter.

As discussed above, determining the RTT between two nodes relies on identifying the reference RF signals that followed the LOS path between the transmitter and the receiver. To exploit the polarization of reference RF signals to identify the LOS path, the receiver (e.g., a UE) can perform separate measurements per downlink reference RF signal (e.g., PRS$_1$ and PRS$_2$) port, which may be sent on different polarizations, for a given set of resource elements. The receiver's reference RF signal response (e.g., an RTT response signal) and reception-to-transmission (Rx-Tx) time report may be separate per reference RF signal port, and thus per polarization.

Figure 12:
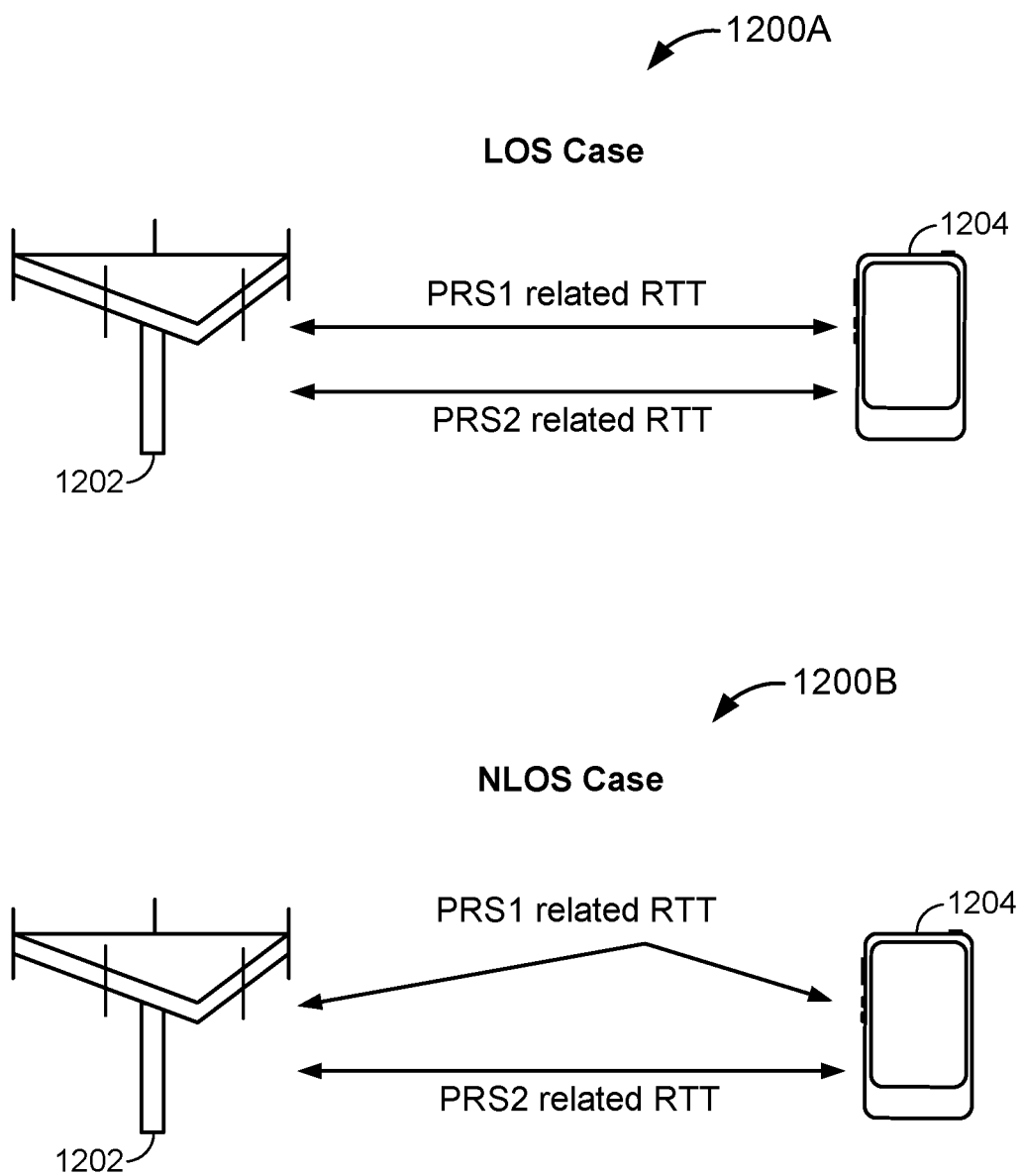
FIG. 12 illustrates an example of differences between LOS and NLOS RTTs, according to aspects of the disclosure.

FIG. 12 illustrates an example of differences between LOS and NLOS RTTs, according to aspects of the disclosure. Example scenario 1200A represents the LOS case, in which the RTT between the transmitter (e.g., a base station 1202) and the receiver (e.g., a UE 1504) based on a first downlink reference RF signal (e.g., PRS$_1$) and the RTT based on a second downlink reference RF signal (PRS$_2$) are the same, as illustrated by the equal length RTT lines. In contrast, in example scenario 1200B, which is an NLOS case, the RTT between the transmitter and the receiver based on a first downlink reference RF signal (e.g., $PRS_1$) is longer than the RTT based on a second downlink reference RF signal ($PRS_2$), indicating that the first reference RF signal RTT followed an NLOS path. In that case, the first reference RF signal RTT would be discarded and the second reference RF signal RTT would be used to determine the position of the receiver.

The receiver's transmission of RTT response reference RF signals per port may have a receiver-selected polarization vector, as opposed to the transmitter's selected polarization of the downlink reference RF signals. The polarization vector may be based on measurements made from the reference RF signal (e.g., $PRS_1$ and $PRS_2$) ports according to specification in the applicable standard, configuration by the network, or autonomously by the receiver. The resulting RTT measurements per reference RF signal (e.g., $PRS_1$ and $PRS_2$) port can help deduce the ToAs for LOS paths and/or reflections.

Figure 13:
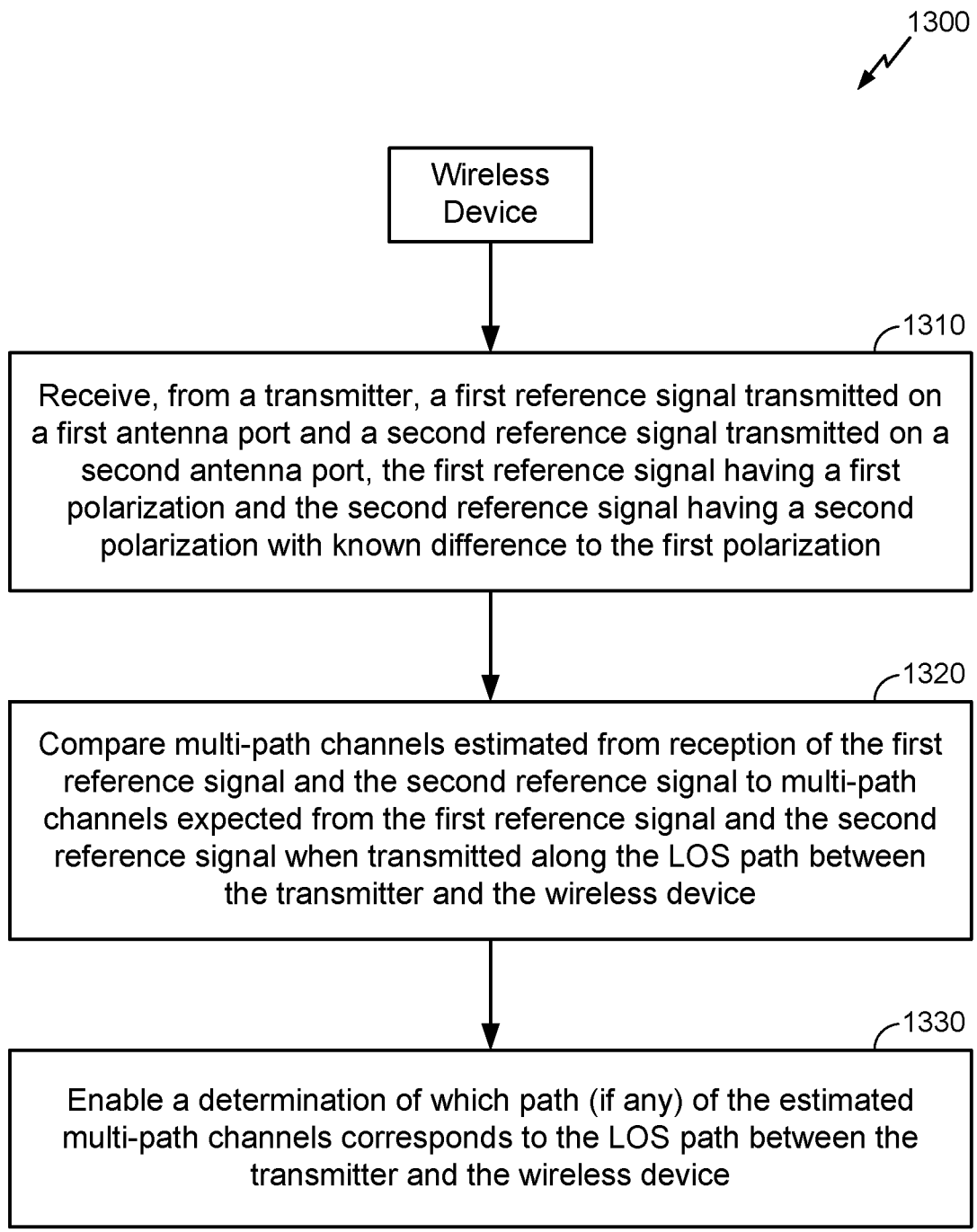
FIG. 13 illustrates a method of determining an LOS path between a transmitter and a wireless device in a wireless communications network, according to aspects of the disclosure.

FIG. 13 illustrates an exemplary method 1300 for determining an LOS path between a transmitter (e.g., a base station or TRP) and a wireless device (e.g., a UE) in a wireless communications network (e.g., wireless communications network 100), according to aspects of the disclosure. In an aspect, the method 1300 may be performed by a wireless device, such as a UE (e.g., UE 304) or a base station (e.g., base station 302).

At 1310, the wireless device receives, from the transmitter, a first reference signal (e.g., $PRS_1$) transmitted on a first antenna port and a second reference signal (e.g., $PRS_2$) transmitted on a second antenna port. The first reference signal may have a first polarization and the second reference signal may have a second polarization with known difference (e.g., perpendicular) to the first polarization. In an aspect, where the method 1300 is performed by a UE, operation 1310 may be performed by antenna(s) 352, receiver(s) 354a, RX processor 356, channel estimator 358, controller/processor 359, and/or memory 360, any or all of which may be considered means for performing this operation. Where the method 1300 is performed by a base station, operation 1310 may be performed by antenna(s) 320, receiver(s) 318b, RX processor 370, channel estimator 374, controller/processor 375, and/or memory 376, any or all of which may be considered means for performing this operation.

At 1320, the wireless device compares the multi-path channels estimated from reception of the first reference signal and the second reference signal to multi-path channels expected from the first reference signal and the second reference signal when transmitted along the LOS path between the transmitter and the wireless device. In an aspect, where the method 1300 is performed by a UE, operation 1320 may be performed by antenna(s) 352, receiver(s) 354a, RX processor 356, channel estimator 358, controller/processor 359, and/or memory 360, any or all of which may be considered means for performing this operation. Where the method 1300 is performed by a base station, operation 1320 may be performed by antenna(s) 320, receiver(s) 318b, RX processor 370, channel estimator 374, controller/processor 375, and/or memory 376, any or all of which may be considered means for performing this operation.

At 1330, the wireless device determines which path (if any) of the multi-path channels corresponds to the LOS path between the transmitter and the wireless device. In an aspect, where the method 1300 is performed by a UE, operation 1330 may be performed by antenna(s) 352, transmitter(s) 354b, TX processor 368, channel estimator 358, controller/processor 359, and/or memory 360, any or all of which may be considered means for performing this operation. Where the method 1300 is performed by a base station, operation 1330 may be performed by antenna(s) 320, transmitter(s) 318a, TX processor 316, channel estimator 374, controller/processor 375, and/or memory 376, any or all of which may be considered means for performing this operation.

In an aspect, the method 1300 may further include (not shown) estimating a location of the wireless device based on a ToA of the path of the estimated multi-path channels that corresponds to the LOS path between the transmitter and the wireless device. For example, the wireless device may use the ToA to calculate the RTT between itself and the transmitter, and from the RTT, an estimate of the location of the wireless device (e.g., using RTTs between the wireless device and other transmitters or just the one RTT and angle of arrival (AoA) or angle of departure (AoD) information). Thus, the wireless device can estimate its own location. Alternatively, the wireless device can report the measurements to a positioning entity (e.g., the serving base station, a location server, or other network entity) to enable the positioning entity to estimate the location of the wireless device.

Figure 14:
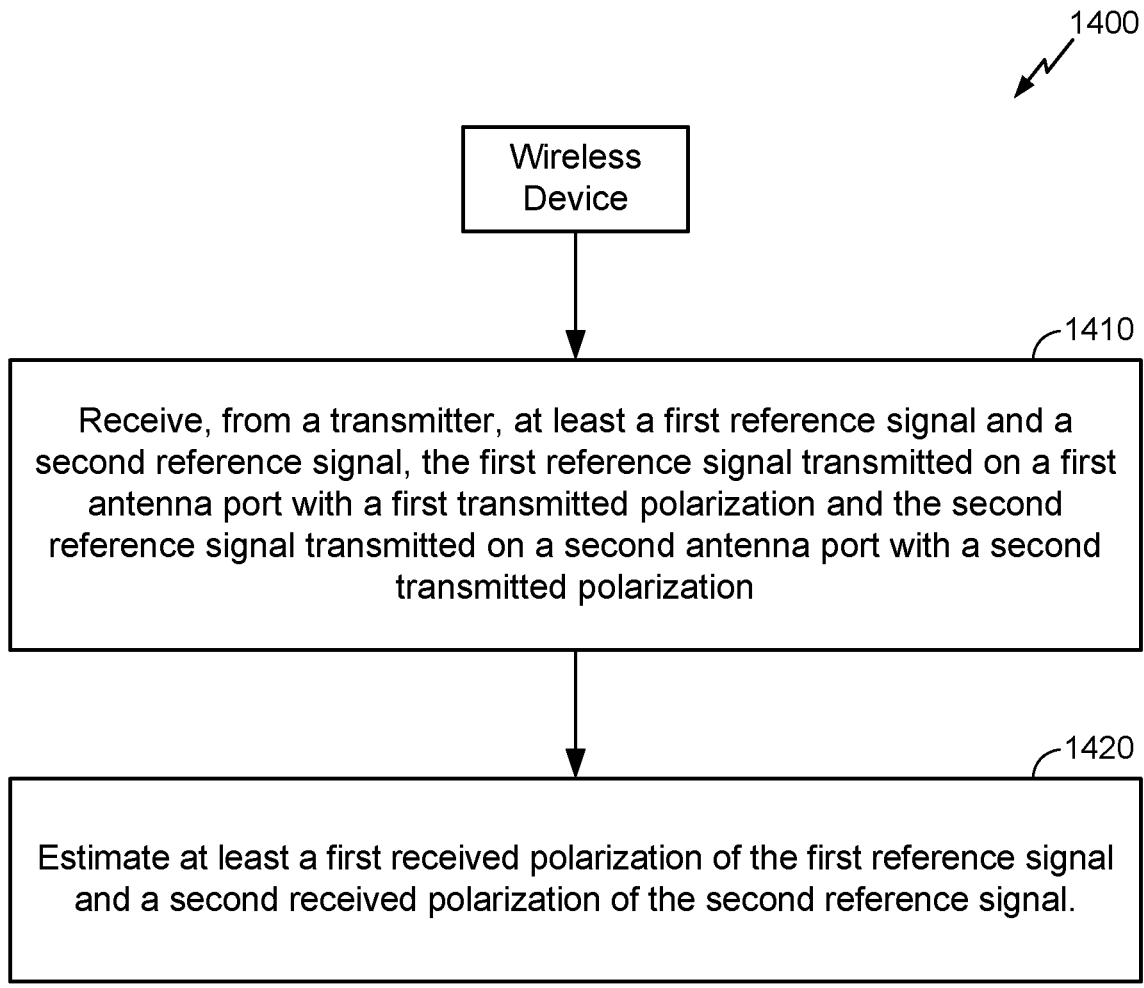
FIG. 14 illustrates an exemplary method for estimating the polarization of a reference signal, according to aspects of the disclosure.

FIG. 14 illustrates an exemplary method 1400 for estimating the polarization of a reference signal, according to aspects of the disclosure. In an aspect, the method 1400 may be performed by a wireless device, such as a UE (e.g., UE 304) or a base station (e.g., base station 302).

At 1410, the wireless device receives, from a transmitter (e.g., a base station or TRP), at least a first reference signal (e.g., $PRS_1$) and a second reference signal (e.g., $PRS_2$), the first reference signal transmitted on a first antenna port with a first transmitted polarization and the second reference signal transmitted on a second antenna port with a second transmitted polarization. In an aspect, where the method 1400 is performed by a UE, operation 1410 may be performed by antenna(s) 352, receiver(s) 354a, RX processor 356, channel estimator 358, controller/processor 359, and/or memory 360, any or all of which may be considered means for performing this operation. Where the method 1400 is performed by a base station, operation 1410 may be performed by antenna(s) 320, receiver(s) 318b, RX processor 370, channel estimator 374, controller/processor 375, and/or memory 376, any or all of which may be considered means for performing this operation.

At 1420, the wireless device estimates at least a first received polarization of the first reference signal and a second received polarization of the second reference signal. In an aspect, where the method 1400 is performed by a UE, operation 1420 may be performed by antenna(s) 352, receiver(s) 354a, RX processor 356, channel estimator 358, controller/processor 359, and/or memory 360, any or all of which may be considered means for performing this operation. Where the method 1400 is performed by a base station, operation 1420 may be performed by antenna(s) 320, receiver(s) 318b, RX processor 370, channel estimator 374, controller/processor 375, and/or memory 376, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method at a wireless device of determining a line-of-sight (LOS) path between a transmitter and the wireless device, comprising:
   receiving, from the transmitter, a first reference signal transmitted on a first antenna port and a second reference signal transmitted on a second antenna port, the first reference signal having a first polarization and the second reference signal having a second polarization with known difference to the first polarization;
   comparing multi-path channels estimated from reception of the first reference signal and the second reference signal to multi-path channels expected from the first reference signal and the second reference signal when transmitted along the LOS path between the transmitter and the wireless device; and
   determining which path of the estimated multi-path channels corresponds to the LOS path between the transmitter and the wireless device based on the comparison.

2. The method of claim 1, wherein the comparing comprises:
   comparing a receive power of the first reference signal and a receive power of the second reference signal to expected receive powers of the first reference signal and the second reference signal.

3. The method of claim 2, wherein the determining comprises:
   determining whether the receive power of the first reference signal and the receive power of the second reference signal matches the expected receive powers of the first reference signal and the second reference signal.

4. The method of claim 1, wherein the first polarization and the second polarization are rotated relative to previous polarizations of the first reference signal and the second reference signal.

5. The method of claim 4, wherein the previous polarizations of the first reference signal and the second reference signal are rotated by the transmitter randomly or uniformly.

6. The method of claim 4, further comprising:
   receiving an indication from the transmitter of how the first polarization and the second polarization are rotated; and determining an expected polarization of each of the first and second reference signals based on the indication.

7. The method of claim 6, wherein the determining comprising:
determining, based on the first polarization matching the expected polarization of the first reference signal, that the first reference signal followed the LOS path.

8. The method of claim 7, wherein the determining further comprises:
determining, based on the second polarization not matching the expected polarization of the second reference signal, that the second reference signal is a reflection.

9. The method of claim 6, wherein the indication is received over Layer 1 signaling, higher layer signaling, downlink control information (DCI) signaling, or radio resource control (RRC) signaling.

10. The method of claim 1, wherein the comparing comprises:
comparing a first vector measurement of a measurement of the first reference signal and a second vector measurement of a measurement of the second reference signal to expected vector measurements of the first reference signal and the second reference signal.

11. The method of claim 10, wherein the first and second vector measurements comprise first and second amplitude measurements, respectively, of the first reference signal and the second reference signal.

12. The method of claim 10, wherein the measurements of the first reference signal and the second reference signal comprise first and second time of arrival (ToA) measurements, respectively, of the first reference signal and the second reference signal.

13. The method of claim 10, wherein the determining comprises:
determining which of the first vector measurement and the second vector measurement of the second reference signal matches the expected vector measurements of the first reference signal and the second reference signal.

14. The method of claim 1, further comprising:
reporting, to a positioning entity, a ToA of the first reference signal, the first polarization, a ToA of the second reference signal, and the second polarization to enable the positioning entity to determine whether the first reference signal or the second reference signal reflected off of a ground surface near the wireless device based on the ToA of the first reference signal, the first polarization, the ToA of the second reference signal, and the second polarization.

15. The method of claim 1, wherein the determining comprises:
determining whether the first reference signal or the second reference signal reflected off of a ground surface near the wireless device based on a ToA of the first reference signal, the first polarization, a ToA of the second reference signal, and the second polarization.

16. The method of claim 1, further comprising:
sending, to the transmitter, an indication that the wireless device is capable of determining a polarization of a reference signal.

17. The method of claim 1, further comprising:
receiving, from the transmitter, an indication that the first and second reference signals are quasi-co-located (QCL) across different polarizations.

18. The method of claim 1, further comprising:
reporting, to the transmitter, a ToA of the path of the estimated multi-path channels that corresponds to the LOS path.

19. The method of claim 1, wherein the comparing comprises:
calculating, for each of the first reference signal and the second reference signal, a round-trip-time (RTT) between the transmitter and the receiver using an RTT positioning procedure.

20. The method of claim 1, wherein the first reference signal is transmitted on a first bandwidth segment and the second reference signal is transmitted on a second bandwidth segment.

21. The method of claim 1, wherein:
the wireless device comprises a user equipment and the transmitter comprises a gNode B,
the wireless device comprises a first gNode B and the transmitter comprises a second gNode B, or
the wireless device comprises a first gNode B and the transmitter comprises a user equipment.

22. The method of claim 1, further comprising:
estimating a location of the wireless device based on a ToA of the path of the estimated multi-path channels that corresponds to the LOS path between the transmitter and the wireless device.

23. A method at a wireless device, comprising:
receiving, from a transmitter, at least a first reference signal and a second reference signal, the first reference signal transmitted on a first antenna port with a first transmitted polarization and the second reference signal transmitted on a second antenna port with a second transmitted polarization; and
estimating at least a first received polarization of the first reference signal and a second received polarization of the second reference signal to determine whether the first reference signal, the second reference signal, or both followed a line of sight (LOS) path between the transmitter and the wireless device.

24. The method of claim 23, further comprising:
comparing the first received polarization to an expected received polarization associated with the LOS path.

25. The method of claim 24, further comprising:
determining that the first reference signal is a non-line of sight (NLOS) signal based on the comparing.

26. The method of claim 24, further comprising:
determining that the first reference signal is an LOS signal based on the comparing.

27. The method of claim 23, further comprising:
determining a time of arrival (ToA) of the first reference signal.

28. The method of claim 23, further comprising:
determining a ToA for the first reference signal and a ToA for the second reference signal; and
transmitting, to a network apparatus, at least the ToA for the first reference signal, the ToA for the second reference signal, the first received polarization, and the second received polarization.

29. A wireless device, comprising:
a memory;
at least one transceiver; and
at least one processor, the at least one processor configured to:
receive, from a transmitter device via the at least one transceiver, a first reference signal transmitted on a first antenna port and a second reference signal transmitted on a second antenna port, the first reference signal having a first polarization and the second reference signal having a second polarization with known difference to the first polarization;

compare multi-path channels estimated from reception of the first reference signal and the second reference signal to multi-path channels expected from the first reference signal and the second reference signal when transmitted along a line-of-site (LOS) path between the transmitter and the wireless device; and determine which path of the estimated multi-path channels corresponds to the LOS path between the transmitter and the wireless device.

30. The wireless device of claim 29, wherein:
the at least one processor being configured to compare comprises the at least one processor being configured to compare a receive power of the first reference signal and a receive power of the second reference signal to expected receive powers of the first reference signal and the second reference signal, and the at least one processor being configured to determine comprises the at least one processor being configured to determine whether the receive power of the first reference signal and the receive power of the second reference signal matches the expected receive powers of the first reference signal and the second reference signal.

31. The wireless device of claim 29, wherein the at least one processor being configured to compare comprises the at least one processor being configured to:
compare a first vector measurement of a measurement of the first reference signal and a second vector measurement of a measurement of the second reference signal to expected vector measurements of the first reference signal and the second reference signal.

32. The wireless device of claim 29, wherein the at least one processor being configured to determine comprises the at least one processor being configured to:
determine whether the first reference signal or the second reference signal reflected off of a ground surface near the wireless device based on a ToA of the first reference signal, the first polarization, a ToA of the second reference signal, and the second polarization.

33. The wireless device of claim 29, wherein the at least one processor is further configured to:
estimate a location of the wireless device based on a ToA of the path of the estimated multi-path channels that corresponds to the LOS path between the transmitter and the wireless device.

34. A wireless device, comprising:
a memory;
at least one transceiver; and
at least one processor, the at least one processor configured to:
receive, from a transmitter device via the at least one transceiver, at least a first reference signal and a second reference signal, the first reference signal transmitted on a first antenna port with a first transmitted polarization and the second reference signal transmitted on a second antenna port with a second transmitted polarization; and estimate at least a first received polarization of the first reference signal and a second received polarization of the second reference signal to determine whether the first reference signal, the second reference signal, or both followed a line of sight (LOS) path between the transmitter and the wireless device.

35. The wireless device of claim 34, wherein the at least one processor is further configured to:
compare the first received polarization to an expected received polarization associated with the LOS path.

36. The wireless device of claim 34, wherein the at least one processor is further configured to:
determine a ToA for the first reference signal and a ToA for the second reference signal; and
cause the at least one transceiver to transmit, to a network apparatus, at least the ToA for the first reference signal, the ToA for the second reference signal, the first received polarization, and the second received polarization.

* * * * *